000

United States Patent
Bhadauria et al.

(10) Patent No.: US 10,761,893 B1
(45) Date of Patent: Sep. 1, 2020

(54) AUTOMATICALLY SCALING COMPUTE RESOURCES FOR HETEROGENEOUS WORKLOADS

(71) Applicant: Amazon Technologies, Inc., Seattle, WA (US)

(72) Inventors: Vivek Bhadauria, Redmond, WA (US); Praveenkumar Udayakumar, Seattle, WA (US); Jonathan Andrew Hedley, Seattle, WA (US); Vasant Manohar, Redmond, WA (US); Andrea Olgiati, Gilroy, CA (US); Rakesh Madhavan Nambiar, Seattle, WA (US); Gowtham Jeyabalan, Redmond, WA (US); Shubham Chandra Gupta, Seattle, WA (US); Palak Mehta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/199,014

(22) Filed: Nov. 23, 2018

(51) Int. Cl.
  *G06F 9/46* (2006.01)
  *G06F 9/50* (2006.01)

(52) U.S. Cl.
  CPC ............ *G06F 9/5044* (2013.01); *G06F 9/505* (2013.01); *G06F 9/5077* (2013.01); *G06F 2209/508* (2013.01); *G06F 2209/5011* (2013.01)

(58) Field of Classification Search
  None
  See application file for complete search history.

Primary Examiner — Gregory A Kessler
(74) Attorney, Agent, or Firm — Nicholson De Vos Webster & Elliott LLP

(57) ABSTRACT

Techniques are described for automatically scaling (or "auto scaling") compute resources—for example, virtual machine (VM) instances, containers, or standalone servers—used to support execution of service-oriented software applications and other types of applications that may process heterogeneous workloads. The resource requirements for a software application can be approximated by measuring "worker pool" utilization of instances of each service, where a worker pool represents a number of requests that the service can process concurrently. A scaling service can thus be configured to scale the compute instances provisioned for a service in proportion to worker pool utilization, that is, compute instances can be added as the fleet's worker pools become more "busy," while compute instances can be removed when worker pools become inactive.

20 Claims, 7 Drawing Sheets

AUTOMATICALLY SCALING COMPUTE RESOURCES FOR HETEROGENEOUS WORKLOADS

BACKGROUND

Modern software applications are often developed as one or more independent but interrelated components (or "services") according to so-called service-oriented architecture (SOA) design principles. Each of the constituent services of a service-oriented software application typically implements a self-contained and discrete unit of functionality and interoperates with other services via defined application programming interfaces (APIs) to carry out the broader functionality of the application formed by the collection of services. The implementation of software applications using SOA design principles can often improve the modularity and resiliency of the applications and can better enable development teams to create, deploy, and scale respective services independently, among other benefits.

The modular nature of the services forming a service-oriented software application, each implementing different types of functionality, often means that each service can be associated with different computing resource needs—for example, some services can be more central processing unit (CPU) and input/output (I/O) intensive, while other services are more graphics processing unit (GPU) intensive, and so forth. Furthermore, the variable nature of workloads processed by some applications can cause different types of computing resources and different services to become constrained at various points in time. Application developers and system administrators of such software applications often have a difficult time determining an appropriate amount of computing resources to devote to each of the various application components and to appropriately scale the provisioned resources as workloads change over time.

BRIEF DESCRIPTION OF DRAWINGS

Various embodiments in accordance with the present disclosure will be described with reference to the drawings, in which.

DETAILED DESCRIPTION

Figure 1:
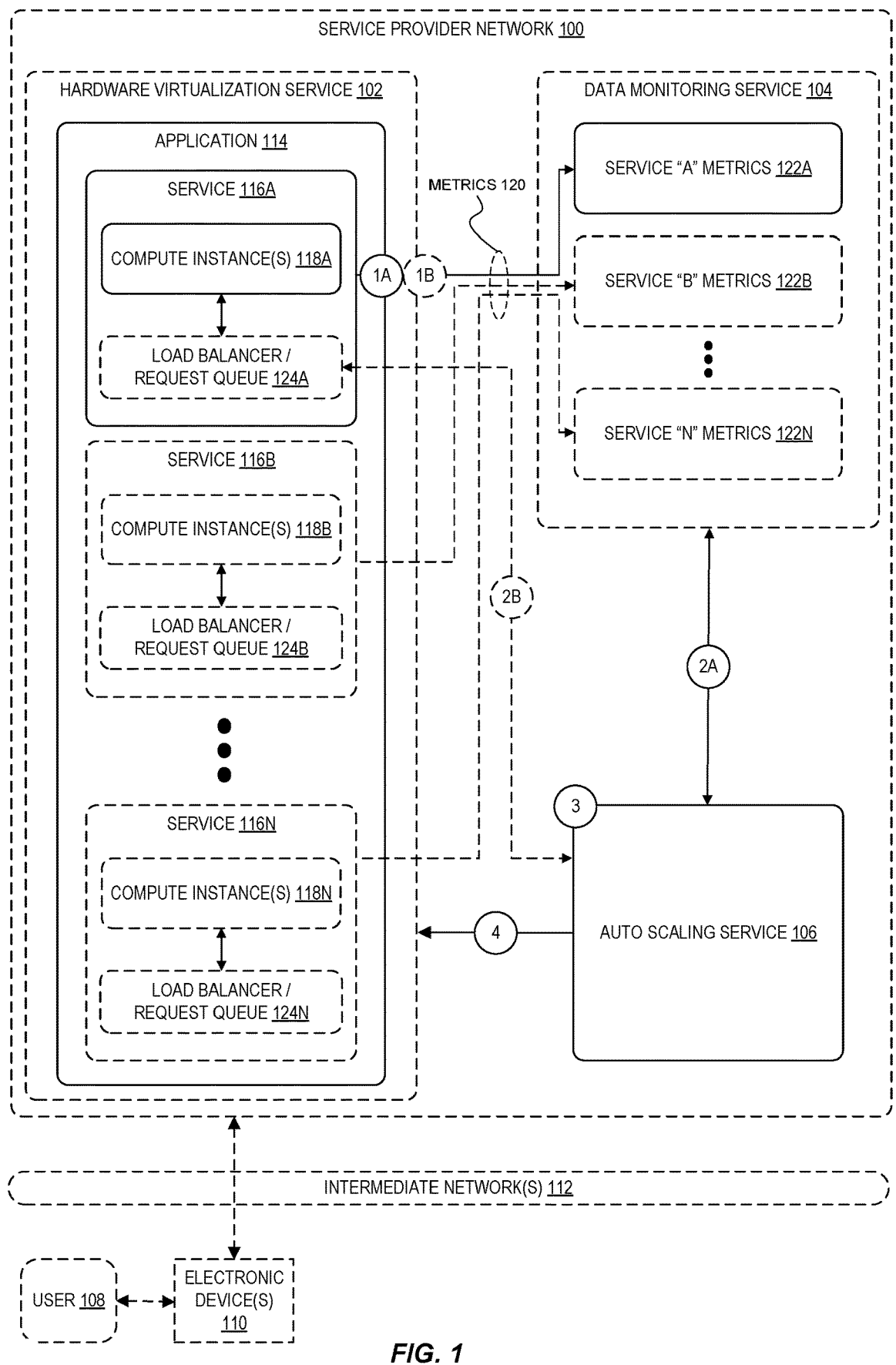
FIG. 1 is a diagram illustrating an environment for automatically scaling a fleet of compute instances executing a software application based at least in part on worker pool utilization metrics obtained from the compute instances according to some embodiments.

Various embodiments of methods, apparatus, systems, and non-transitory computer-readable storage media are described for automatically scaling (or "auto scaling") compute resources—for example, virtual machine (VM) instances, containers, or standalone servers—used to support execution of service-oriented software applications and other types of applications that may process heterogeneous workloads.

Modern software applications are often developed as one or more independent but interrelated components (or "services") according to service-oriented architecture (SOA) design principles. Each of the constituent services of a service-oriented software application typically implements a self-contained and discrete unit of functionality and interoperates with other services via defined APIs to carry out the broader functionality of the application formed by the collection of services. The implementation of software applications using SOA design principles can often improve the modularity and resiliency of the applications and can better enable development teams to create, deploy, and scale respective services independently, among other benefits.

The modular nature of the services forming a service-oriented software application, each typically implementing different types of functionality, often means that each service can be associated with different computing resource needs—for example, some services can be more CPU- and I/O-intensive while other services are more GPU-intensive, and so forth. Furthermore, the variable nature of workloads processed by some applications and services can cause different types of computing resources and services to become constrained at various points in time.

As an example, consider a software application that can be used to automatically identify objects, people, text, or possibly other elements contained in images or video content provided as input. A service-oriented implementation of such an application might include one service implementing a frontend used to receive image/video file input from users and to present various types of application output. Another service might implement image/video preprocessing tasks such as resizing, transcoding, or other operations on the input data that may facilitate subsequent processing steps. Yet another service might be used to recognize objects and human faces in the images/videos, another service used to recognize text, and so forth, where each of the services communicate with one another to carry out the broader image/video recognition functionality of the application. In this example, a service that performs facial recognition can have its available GPU resources constrained if it receives a workload comprised of images containing large numbers of faces. The I/O and CPU resources of other services can be constrained if the application later receives a workload containing high quality images that are large in file size. Furthermore, each service may rely on one or more external services or other components for various processing steps and can be constrained by one or more underperforming dependent resources. In these and other situations, application developers and system administrators often have a difficult time determining an appropriate amount of computing resources to devote to each of the various application services and a difficult time appropriately scaling the provisioned resources for each service as workloads change over time.

Service provider networks have enabled software developers to more easily develop, deploy, and scale service-oriented applications. A service provider network provides users with the ability to use a variety of computing-related resources such as compute resources (for example, by hosting VM instances or containers, executing batch jobs, executing code without provisioning servers, and so forth), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), and so forth. These and other computing resources may be provided as services (used here in a somewhat different, but related, context as the services of a service-oriented software application), such as a hardware virtualization service that can execute compute instances, a storage service that can store data objects, and the like. Developers can use the wide variety services offered to implement virtually any type of service-oriented or traditional software application.

While the services provided by such service provider networks enable users to provision and use virtually any desired amount of computing resources to host and execute developed software applications, as indicated above, it remains a challenge to appropriately scale the provisioned computing resources supporting an application such that the computing resources are not under-provisioned or over-provisioned as workloads change over time. Some service providers provide so-called "auto scaling" services that enable the automatic scaling of users' computing resource capacity according to user-defined conditions. An auto scaling service, for example, can be used to manage a "fleet" of compute instances (for example, including any number of VMs, containers, or other types of compute resources) used to execute one or more application services and to ensure that a desired number of instances are available to maintain the health and availability of the software application. The use of an auto scaling service to manage a fleet of compute instances, for example, can be based on user-created auto scaling policies that define conditions for automatically increasing fleet capacity during demand spikes to maintain performance and automatically decreasing capacity during lulls to reduce resource waste.

Existing auto scaling services typically operate by monitoring the health of running compute instances, replacing impaired instances with new instances, and dynamically scaling a number of instances in a fleet as described above. For example, a user can configure an auto scaling policy to monitor a resource load metric for a user's application (for example, based on CPU utilization, GPU utilization, or I/O latency) and can scale when average utilization of a selected resource for the fleet exceeds a defined threshold. If load changes for an application are predictable, users can also schedule scaling activities (for example, to increase capacity during weekdays but decrease capacity during weekends). For software applications with predictable and homogeneous workloads, the most constrained resource—for example, CPU, GPU, memory, or I/O—is typically the same and can be independently monitored and scaled as needed.

As indicated above, however, the workloads processed by some applications often fail to trend along simple resource lines or based on predictable patterns. Using the image/video recognition application again as an example, CPU and I/O resources of some services of the application may be constrained as the size of input images/videos increases, while GPU resources instead may be constrained as object density increases. For applications associated with such heterogeneous workloads, a most constrained resource can change over time depending on each workload received by such applications. Furthermore, a most constrained resource for various services of service-oriented application may not be local and a service may instead be constrained because resources are under-provisioned for one or more dependent services. Auto-scaling without considering dependent services can cause further strain on the dependent service, further degrading user experience of the application as a whole.

As illustrated by the examples above, it can be desirable to scale fleets of compute instances supporting various services of a service-oriented applications more generally based on an indication of how "busy" each service is, regardless of which type of resource is most constrained at any given time. Furthermore, a desirable metric value increases and decreases proportionally as compute instances are added or removed from a fleet of instances supporting a service. According to embodiments described herein, the resource requirements for each service are approximated by measuring "worker pool" utilization of compute instances executing each service, where a worker pool represents a number of requests that the service can process concurrently. A scaling service can thus be configured to scale the compute instances provisioned for a service in proportion to the measured worker pool utilization—that is, compute instances can be added when a fleet's worker pools become more "busy" while compute instances can be removed when worker pools become inactive.

In some embodiments, a process for auto scaling a fleet of compute instances supporting a software application further accounts for incoming application traffic (for example, based on a number of pending requests in an application queue or a number of pending requests received by a load balancer), thereby enabling the scaling process to more proactively scale services with significant workloads to be processed in the near future. In an embodiment, an auto scaling process can further account for constraints that are caused by dependent, or "downstream," services or any other type of non-hardware constraints (for example, database locking issues, application bugs, and so forth). In these instances, the auto scaling process can be configured to refrain from scaling upstream services when it would likely only serve to further overload downstream services. In general, using a worker pool utilization metric (also referred to as a fleet utilization metric to indicate worker pool utilization across an entire fleet of instances) as a basis for scaling a fleet of compute instances naturally factors in the compute instances' local resource usage across heterogeneous workloads and across different types of applications. Among other benefits, the auto scaling techniques described herein can be used to increase hardware utilization, enable software applications to react quickly to workload variations, and can be reused across different types of applications and workloads.

FIG. 1 is a block diagram illustrating an environment for automatically scaling a fleet of compute instances executing a service-oriented software application based at least in part on worker pool utilization metrics obtained from the compute instances. In some embodiments, a hardware virtualization service 102, a data monitoring service 104, an auto scaling service 106, and other possible services operate as part of a service provider network 100 and each comprises one or more software modules executed by one or more electronic devices at one or more data centers and geographic locations. A user using one or more electronic device(s) (which may be part of or separate from the service provider network 100) can interact with the various services of the service provider network 100 via one or more networks, such as the internet.

As indicated above, a service provider network 100 provides users with the ability to use a variety of computing-related resources such as compute resources (for example, executing virtual machine (VM) instances or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, and so forth. The users (or "customers") of provider networks 100 may utilize one or more user accounts that are associated with a customer account, though these terms may be used somewhat interchangeably depending upon the context of use. Users 108 may interact with a service provider network 100 using electronic devices 110 and across one or more intermediate networks 112 (for example, the internet) via one or more interface(s), such as through use of application programming interface (API) calls, via a console implemented as a website or application, and so forth. The interface(s) may be part of, or serve as a front-end to, a control plane of the provider network 100 that includes "backend" services supporting and enabling the services that may be more directly offered to users.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In FIG. 1, a software application 114 is implemented using compute resources (for example, VMs, containers, standalone servers, or any other type of compute capacity) provided by a hardware virtualization service 102. In one embodiment, an application 114 includes some number of separate services 116A-116N, each of which may be implemented using service-oriented design principles. Referring again to an example image/video recognition service, a service 116A might implement an application frontend, service 116B might implement various image/video preprocessing operations, and service 116N might implement various object recognition processes. Although the example application 114 includes several separate services, in general, the auto scaling techniques described herein can apply to standalone software applications or applications comprised of any number of independent components.

As shown in FIG. 1, each of the services 116A-116N executes on some number of compute instances of the hardware virtualization service 102 (for example, service 116A runs on compute instance(s) 118A, service 116B runs on compute instance(s) 118B, and service 116N runs on compute instance(s) 118N), where each compute instance can host a separate instance of a corresponding service (for example, as a separate instance of the application running on a VM or container). In an embodiment, the compute instances executing a service can be hosted on any number of computing devices (for example, each of the compute instance(s) 118A can be hosted by a separate computing device or, in some cases, a computing device can host two or more compute instances 118A). As described above, the number of compute instances used for each service initially can be selected and provisioned based on an expected workload for each of the separate services. In some embodiments, a service provider network 100 offers a variety of compute instance types each having different resource capacities, and a type of compute instance used for each service can be selected further based on an expected type of workload for the service. For example, compute instances associated with greater CPU capacity can be provisioned for a more CPU-intensive service, while compute instances associated with greater GPU capacity can be provisioned for another service that is typically more GPU-intensive.

In some embodiments, the compute instances provisioned for one or more of the services 116A-116N can be associated with a respective "auto scaling group." An auto scaling group defines a logical grouping, or fleet, of compute instances that may share similar characteristics and can be treated collectively for the purposes managing and scaling the group of instances. For example, if a service executes across multiple instances of an auto scaling group, it may be desirable at times to increase the number of instances in that group to improve the performance of the application or to decrease the number of instances to reduce costs when demand is low. As indicated above, an auto scaling group can be associated one or more auto scaling policies that define conditions for automatically scaling up or down the number of instances. As described in more detail hereinafter, some or all of the compute instances executing the services 116A-116N are configured to collect and send one or more metrics that enable a scaling process to determine when to scale the size of a corresponding auto scaling group, for example, by comparing the obtained metrics to one or more corresponding auto scaling policies.

In one embodiment, some of all of the compute instances 118 are configured to emit various performance metrics 120 to a data monitoring service 104 of the service provider network 100. A data monitoring service 104 generally can be used to collect monitoring and operational data in the form of logs, metrics, and events, related to virtually any type of computing resource of a service provider network 100. In some embodiments, a data monitoring service 104 can be further used to set alarms, visualize logs and metrics, take automated actions, and further enable users to discover insights to optimize applications. As described hereinafter, in some embodiments, performance metrics collected by a data monitoring service 104 from compute instances can be used by a scaling service 106 to make auto scaling decisions.

In an embodiment, at the circle labeled "1A" in FIG. 1, some or all of the compute instances supporting the services 116A-116C the application 114 periodically obtain and send worker pool utilization metrics to the data monitoring service 104. A "worker pool" generally corresponds to an amount of parallelization designed for each instance of a service, where a worker in a worker pool can process an incoming request if the worker is not presently busy. For example, if the software implementing service 116A is designed with a worker pool including a maximum of five total workers, each instance of the service can process up to five separate requests in parallel. If all five workers are busy and an additional request is received, the additional request is queued until one of the workers becomes available. In most cases, the size of a worker thread pool is static, but a worker pool can also be adaptive in size in some applications.

In an embodiment, the management of a worker pool can be native to a programming language in which the software implementing a service is implemented. For example, if the software implementing the service 116A is developed using the Java programming language, the Java programming language provides native support for configuring and using worker pools (also referred to as "thread pools" consisting of "worker threads"). Many other programming languages similarly enable management of worker pools or allow developers to create and manage their own. In an embodiment, the process for each compute instance 118 obtaining and sending a threat utilization metric to a data monitoring service 104 can thus depend on the nature of the service. For example, logic for periodically obtaining and sending a worker pool utilization metric can be built into the code for some services, for example, either directly in the code or indirectly via a wrapper or software developer's kit (SDK). In other embodiments, a process external to the service (for example, an operating system component, hypervisor component, or other component of a host computing device upon which the service is executing) or external to the host computing device can be used to obtain the worker pool metric, for example, by periodically polling each instance of the service for its current worker pool utilization.

As indicated above, some or all of the compute instances implementing a service of the application 114 emits an instance utilization metric, which indicates a number of "busy" threads relative to a total size of the worker pool. A worker is counted as busy if the worker is currently processing a request. In some embodiments, the compute instances 118 can obtain and send worker pool utilization metrics to a data monitoring service 104 or other system component in association with a "namespace" that identifies the service to which the metric relates (for example, compute instances 118A executing the service 116A can be configured to emit metrics 122A to a "Service A" namespace, compute instances 118B can be configured to emit metrics 122B to the "Service B" namespace, and so forth). As described in more detail below, an average (or median, maximum, minimum, or the like) worker pool utilization metric can thus be determined for each service separately by obtaining metrics published to the service's corresponding namespace.

In an embodiment, at circle "1B," each compute instance optionally obtains and periodically sends one or more additional metrics including, but not limited to, a metric indicating performance of one or more dependent, or "downstream," services, a processed requests metric indicating how many requests the instance has successfully processed in a past time window, a pending requests metric indicating how many requests the instance has pending (for example, in a pending requests queue managed by the service), and so forth. The additional metrics may be sent together with or separately from the worker pool utilization metrics.

In some cases, the design of one or more of services does not include a worker pool that can be measured. For example, some services might be designed such that only a single process processes requests or are otherwise implemented in a way that prevents obtaining a worker pool utilization metric. In one embodiment, services that do not include a measurable worker pool can instead be configured to emit a request latency metric that measures an amount of time or average amount of time elapsed to process requests received by those instances of the service. In one embodiment, a request latency metric is calculated based on a sum of latencies for requests processed in a defined period of time (for example, during the past minute, hour, or other timeframe). In this example, a total amount of time can be calculated for a service based on the defined window of time in which to accumulate the latency metrics, multiplied by the total number of instances of the service (for example, one minute multiplied by ten instances equals ten minutes of total time). In this example, instance utilization can be calculated by dividing the sum of the request latencies by the total amount of time over which the request latencies were accumulated.

As indicated above, each compute instance executing a service can also optionally emit a processed requests metric indicating a number of requests that the instance has successfully processed in a past time window. For example, instances can be configured to measure a number of requests successfully processed by an instance in each minute, hour, or other time window, and further configured to periodically send the measurement to the data monitoring service 104 or other location.

In some embodiments, compute instances executing a service can optionally obtain and send metrics indicating performance of one or more dependent services. For example, each compute instance optionally can periodically send metrics to a data monitoring service 104 indicating latency of requests sent by the service to one or more dependent services and/or metrics indicating occurrences of error messages received from downstream services. In some embodiments, instead of or in addition to collecting and sending metrics indicating downstream service performance, compute instances can be configured to underreport their own worker pool utilization metrics in response to detecting issues with one or more dependent services.

In one embodiment, to account for latencies or other issues associated with dependent services, compute instances executing a service can include an aggregator thread that sums up the "busy" times for the instance over a time window, where "busy time" indicates an amount of time a compute instance spends processing requests. In this example, however, if a request fails because of an issue with a dependent service (for example, as identified based on an error message returned by the dependent service), the time spent processing the request is not counted towards the compute instance's busy time. For example, instances can emit an instance utilization metric that is calculated based on the following formula: sum of reported busy times in the aggregation window/(the time window*worker thread pool size). In this manner, the scaling decision for the service can be based on only how busy the instances are themselves instead of how busy compute instances may be due to dependent service latencies or other issues.

In an embodiment, at circle "2A" in FIG. 1, an auto scaling service 106 obtains one or more of the following metrics for a service for a past time window: a worker pool utilization metric, a processed requests metric, and a dependent service latency metric. The auto scaling service 106 can be configured to obtain the metrics on a periodic basis (which can be based on a default period, configured by a user, and/or adaptively based on a service's workload over time) or in response to a request to measure a current status of a service. In some embodiments, a separate auto scaling service 106 can be configured for each separate service of an application 114; in other embodiments, a single auto scaling process can be configured to auto scale any number of separate services. In some embodiments, an auto scaling service 106 is a separate service of a service provider network 100, while in other embodiments the auto scaling service 106 can be a component of a hardware virtualization service 102 or any other service of the service provider network 100. In one embodiment, the auto scaling service 106 can obtain the metrics for a particular service based on a namespace with which the metrics have been associated, as described above.

As indicated above, an auto scaling service 106 can be configured to scale various services based in part on a number of pending requests to be processed by the services in the future. Thus, in some embodiments, at circle "2B," an auto scaling service 106 optionally obtains data indicating a number of pending requests for a service (for example, requests pending for service 116A in the example of FIG. 1). The example shown in FIG. 1 depicts a scaling service 116 obtaining a pending requests metric from a load balancer or request queue 124A that may be configured to balance requests directed to the service 116A; in general, an auto scaling service 106 can obtain the pending requests metric from any one or more of: a load balancer, a request queue, a network device, an upstream service, or any other system component that can provide information about a number of pending requests for a service. As shown in FIG. 1, each service of an application 114 can be associated with a separate load balancer or request queue or, in some embodiments, a single load balancer or request queue can be configured to route requests for two or more separate services or applications.

In an embodiment, at circle "3," the auto scaling service 106 calculates a fleet utilization metric (indicating worker pool utilization across an entire fleet of instances) and/or fleet load metric (indicating worker pool utilization in combination with other metrics) based on the obtained worker pool utilization metric and, optionally, further based on one or more of an obtained processed requests metric, dependent service latency metric, pending requests metric, or any other related metrics.

In one embodiment, for services which do not include any dependent services, an auto scaling policy can be configured to monitor an obtained worker pool utilization metric for the service and to take scaling actions if the metric exceeds or falls below one or more defined thresholds. For example, a scaling policy for a service can be configured to ensure that an average worker pool utilization metric for a service stays at or below 80% and, if the metric exceeds the defined threshold, the auto scaling service 106 can cause additional compute instances to be added to the fleet of compute instances executing the service. As another example, a scaling policy can additionally be configured so that if the average worker pool utilization metric for a service falls below a defined threshold (for example, 50% utilization), the auto scaling service 106 can cause compute instances to be removed from the associated fleet of compute instances.

In an embodiment, an auto scaling service 106 can be further configured to scale a service by taking into account a current throughput of the service and a number of pending requests associated with the service. As indicated above, in some embodiments, an auto scaling service 106 obtains worker pool utilization metrics, pending requests metrics, and processed requests metrics for compute instances executing a service. In one embodiment, an auto scaling service 106 calculates a current throughput metric for a service based on an obtained processed requests metric and worker pool utilization metric (for example, based on the equation: current throughput=(processed requests*100)/worker pool utilization)). The auto scaling service 106 can then use the obtained current throughput metric to calculate a fleet load metric based on the pending requests metric and the current throughput metric (for example, based on the equation: fleet load metric=(pending requests*100)/current throughput). In an embodiment, an auto scaling service 106 can use the obtained fleet load metric to determine whether to scale up or scale down an associated fleet of compute instances, similar to the description above with respect to scaling based on a worker pool utilization metric. A fleet load metric, for example, may indicate a value such as 1.5 or 2 indicating a need for approximately 1.5× or 2× the number of instances in the associated fleet to maintain a desired level of utilization.

As indicated above, an auto scaling service can independently monitor and scale multiple services of a service-oriented application. In FIG. 1, for example, the auto scaling service 106 can separately monitor and scale a fleet of compute instances executing each of the respective services 116A-116N. In this manner, as variable workloads may constrain different types of resources and services of an application 114 over time, the auto scaling service 106 can automatically scale the compute resources provisioned for each of the separate services accordingly.

In one embodiment, a user can configure an auto scaling policy to prevent the auto scaling service 106 from scaling a specified fleet of instances beyond a certain number of instances. For example, a user may create an auto scaling group initially having 20 instances and specify that the auto scaling group can scale up as needed to no more than 100 instances.

In an embodiment, at circle "4," the scaling process optionally sends scaling instructions to a hardware virtualization service 102 or other system component that manages the fleet of compute instances executing the service. In FIG. 1, for example, the auto scaling process can send scaling instructions to the hardware virtualization service 102 instructing the hardware virtualization service 102 to either increase or decrease a number of compute instances executing the application, assuming that the calculated fleet utilization metric and associated auto scaling policy indicates that scaling is warranted. The hardware virtualization service 102 can then cause additional compute instances to be added to a fleet of compute instances (for example, by launching the compute instances based on a machine or container image associated with the auto scaling group) or cause instances to be removed from the fleet of compute instances.

Although many of the examples herein are described in the context of an application hosted by compute resources of a service provider network 100, in general, the auto scaling processes can be used in any computing environment including service provider networks, on-premises environments, or combinations thereof. For example, a user's on-premises instances can collect and send worker pool utilization metrics to a data monitoring service 104 of a service provider network 100, and an auto scaling service 106 of the service provider network or the user's on-premises environment can obtain the metrics from the data monitoring service and make scaling decisions based on the obtained metrics.

Figure 2:
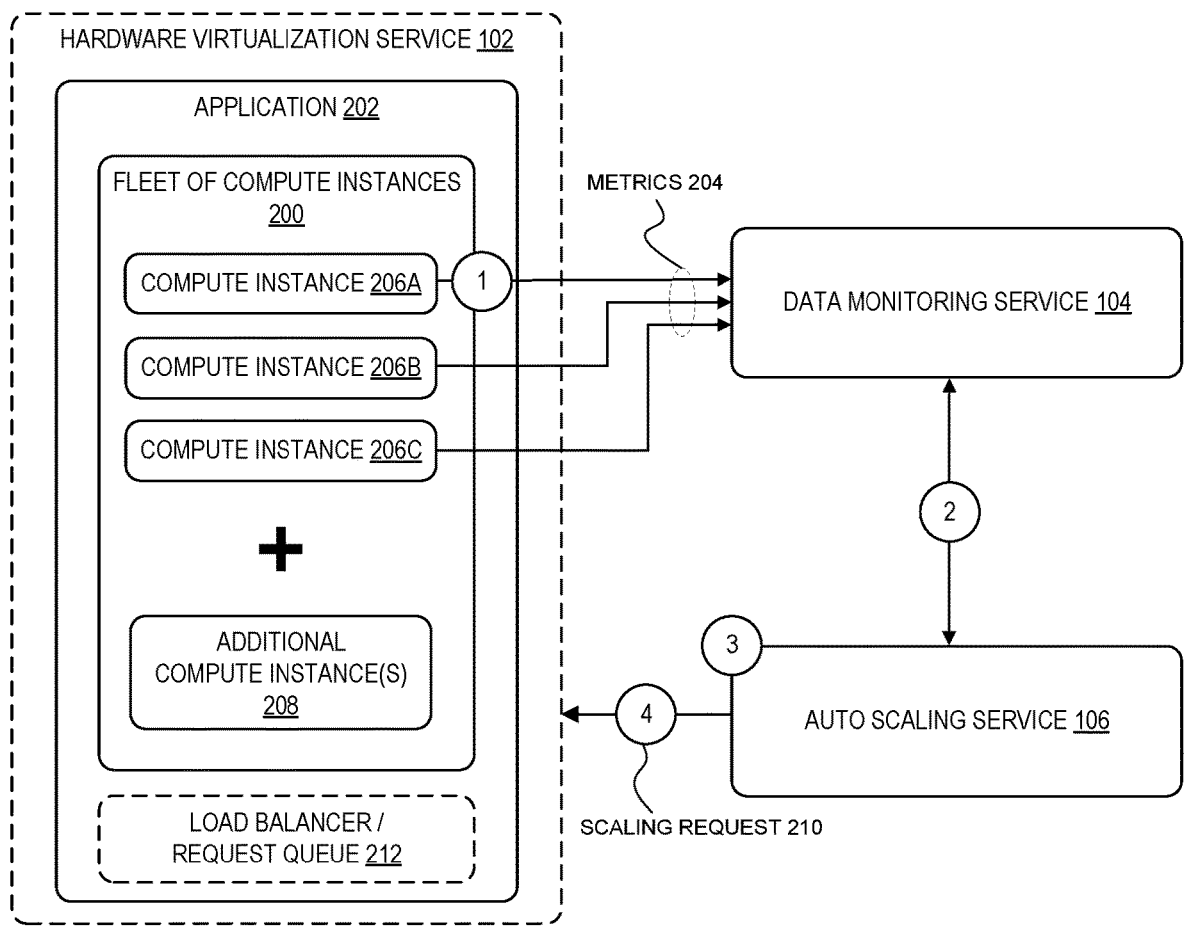
FIG. 2 is a diagram illustrating a more detailed example of scaling a fleet of compute instances executing a software application according to some embodiments.

FIG. 2 is a diagram illustrating a more detailed example of scaling a fleet of compute instances executing a software application according to some embodiments. As shown in FIG. 2, a fleet of compute instances 200 has been provisioned and is executing a software application 202 (which may be a standalone application or an individual service of a service-oriented software application comprising a plurality of services). As illustrated by the circle labeled "1," each of the compute instances 206A-206C obtains and sends to a data monitoring service 104 metrics 204 including worker pool utilization metrics and, optionally, pending requests metrics, processed requests metrics, dependent service latency metrics, and so forth, as described above.

In an embodiment, at the circle labeled "2," an auto scaling service 106 obtains utilization metrics indicating a utilization of the worker pools at the respective compute instances 206A-206C of the fleet of compute instances 200. In an embodiment, at the circle labeled "3," the auto scaling service 106 calculates a fleet utilization metric for the fleet of compute instances 200. As indicated above, the fleet utilization metric can be calculated in various ways including aggregating the worker pool utilization metrics by each compute instance, averaging the worker pool utilization metrics, calculating a median worker pool utilization metric for the fleet, factoring in a pending requests metric (for example, as obtained from a load balancer or request queue 212 or other source), processed requests metrics, or combinations thereof. In the example shown in FIG. 2, the fleet utilization metric aggregates the worker pool utilization metrics emitted by each of the compute instances, for example, to obtain a value of 0.9 indicating that the worker pools collectively are at 90% utilization for the measured time period.

In an embodiment, at the circle labeled "4," the auto scaling service 106 generates a sends a scaling request 210 to the hardware virtualization service 102 based at least in part of the metrics obtained and calculated at circle "3." For example, the fleet of compute instances 200 may be associated with an auto scaling policy that causes the auto scaling service 106 to maintain a maximum fleet utilization of 80% and, thus, the scaling request can instruct the hardware virtualization service 102 to launch one or more additional compute instances 208 to increase the capacity available to the application 202 because the currently calculated utilization exceeds the defined threshold.

Figure 3:
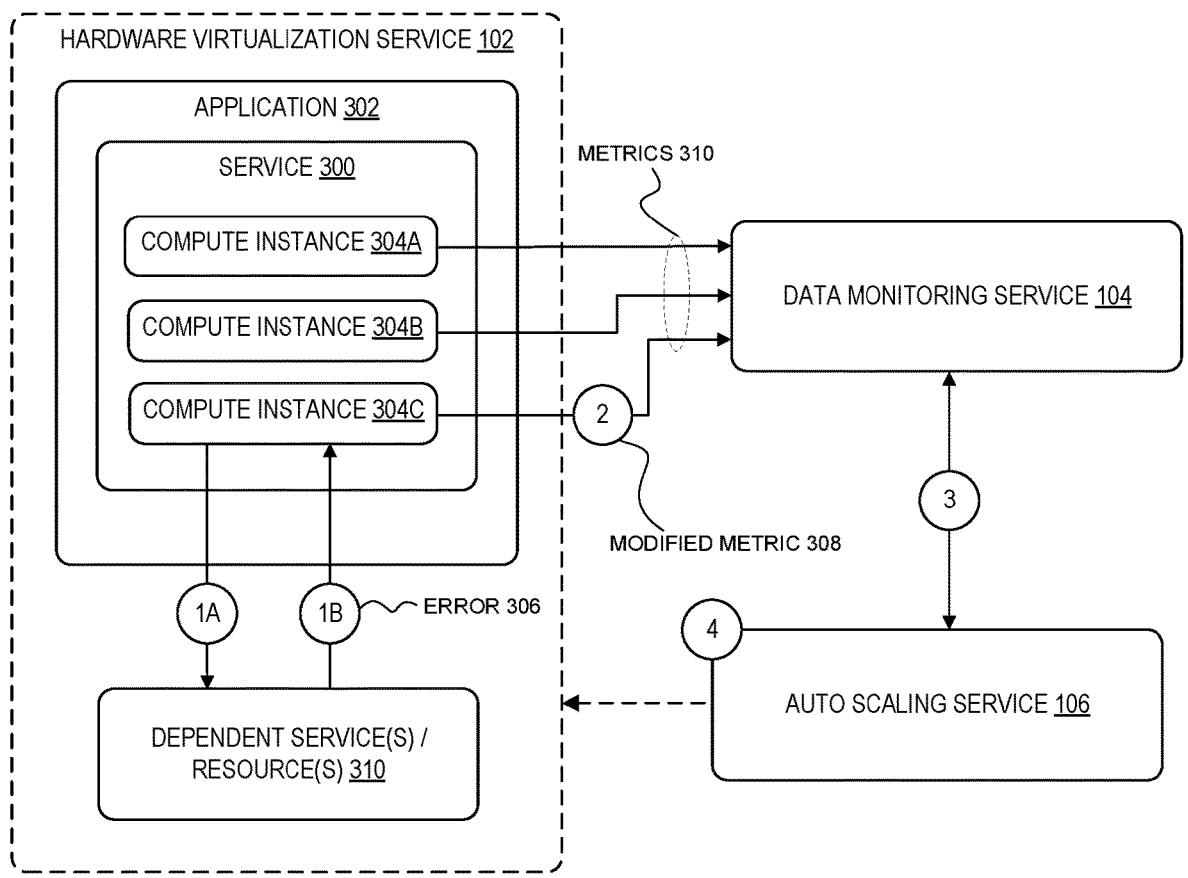
FIG. 3 is a diagram illustrating an example of scaling a fleet of compute instances that may be constrained by one or more dependent services according to some embodiments.

FIG. 3 illustrates compute instances of a fleet reducing a reported utilization metric based on constraints of a dependent service or other system component. In FIG. 3, a fleet of compute instances executes a service 300 of a software application 302. During execution of the service 300, and as illustrated by the circle labeled "1A," a compute instance 304C of the fleet of compute instances generates a request to a dependent service or other resource 310 (which can be a separate service or component of the same application 302, a service or component of an external application, or an external standalone application or component).

As illustrated by the circle labeled "1B" in FIG. 3, under some circumstances, the dependent service or resource 310 may respond to a request from a compute instance executing the service 300 with an error response 306 indicating that an error has occurred during processing of the request or that the service is denying the request, for example, because the service is currently overloaded and is "browning out" additional requests.

In an embodiment, at the circle labeled "2," the compute instance receiving the error response 306 calculates and sends a modified worker pool utilization metric 308 to reflect that one or more requests processed by the compute instance failed or was degraded because of an issue with a dependent service. For example, the compute instance 304C can underreport its calculated worker pool utilization metric, as described above, by not counting time spent processing a request that results in an error message as busy time for the instance. By underreporting the worker pool utilization metrics in this manner, the auto scaling service 106 can avoid scaling up the fleet of compute instances when it would only serve to put additional strain on the underperforming dependent service. Thus, at circle "3," the auto scaling service 106 obtains metrics 310 generated by instances of the service 300A including the modified metric 308 and, at circle "4," determines whether to scale the associated fleet of compute instances. In the example of FIG. 3, the modified metrics may cause the auto scaling service 106 to refrain from scaling the fleet of instance when it may have otherwise.

Figure 4:
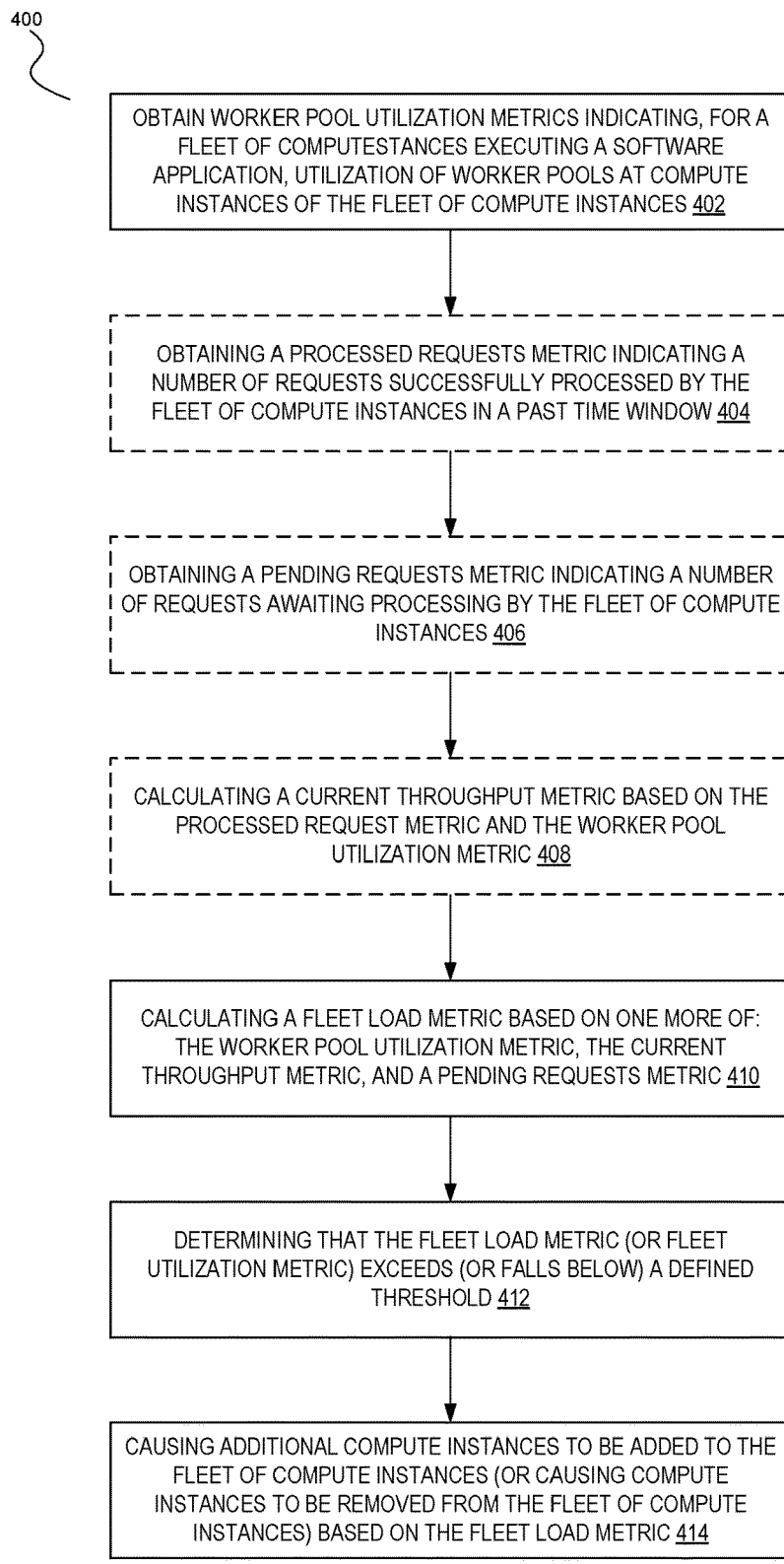
FIG. 4 is a flow diagram illustrating operations of an example method for automatically scaling a fleet of compute instances executing a software application based at least in part on worker pool utilization metrics obtained from the compute instances according to some embodiments.

FIG. 4 is a flow diagram illustrating operations 400 of a method for automatically scaling computing resources implementing an application based on worker pool utilization according to some embodiments. Some or all of the operations 400 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by an application 114, hardware virtualization service 102, data monitoring service 104, and auto scaling service 106 of the other figures.

The operations 400 include, at block 402, obtaining worker pool utilization metrics indicating, for a fleet of compute instances executing a software application, utilization of worker pools at compute instances of the fleet of compute instances. In reference to FIG. 1, for example, worker pool utilization metrics may be generated by compute instances 118 executing a service 116A of a service-oriented application 114. In other examples, the metrics can be generated by a standalone application. In an embodiment, the worker pools process requests using one or more computing resources of the compute instances upon which the worker pools are executing. In an embodiment, the metrics are obtained by an auto scaling service 106 from a data monitoring service 104 that collects the metrics from the compute instances. In one embodiment, each compute instance of the fleet of compute instances manages a respective worker pool, the respective worker pool representing a number of concurrent requests that can be processed by the compute instance managing the respective worker pool.

The operations 400 further include, at block 404, optionally obtaining a processed requests metric indicating a number of requests successfully processed by the fleet of compute instances in a past time window. For example, an auto scaling service 106 can similarly obtain the processed request metric from the data monitoring service 104, which obtains the metrics from the compute instances 118 executing the service.

The operations 400 further include, at block 406, optionally obtaining a pending requests metric indicating a number of requests awaiting processing by the fleet of compute instances. In an embodiment, the auto scaling service 106 can obtain the pending requests metric from the data monitoring service 104. In other embodiments, the auto scaling service 106 can obtain the pending requests metrics from a load balancer 124, a request queue, or any other system component from which information about a number of pending requests can be obtained.

In one embodiment, the fleet utilization metric is periodically obtained from a data monitoring service of a service provider network, and wherein each compute instance of the fleet of compute instances periodically obtains and sends a respective worker pool utilization metric to the data monitoring service.

The operations 400 further include, at block 408, calculating a current throughput metric based on the processed request metric and the worker pool utilization metric. For example, in one embodiment, the auto scaling service 106 can calculate the current throughput metric for a service based on the equation: current throughput metric=(processed requests metric*100)/worker pool utilization metric).

The operations 400 further include, at block 410, calculating a fleet load metric based on one or more of: the worker pool utilization metric, the current throughput metric, and the pending requests metric. For example, in one embodiment, the auto scaling service 106 can calculate the fleet load metric based on the equation: fleet load metric=(pending requests metric*100)/current throughput metric.

In one embodiment, the fleet utilization metric is based on a respective worker pool utilization metric generated by each compute instance of the fleet of compute instances, and one or more of compute instances of the fleet of compute instances calculates a respective worker pool utilization metric based at least in part on latencies associated with one or more dependent services. For example, the latencies can be associated with error messages or other issues encountered by the compute instance during execution and when attempting to make one or more requests to the one or more dependent services.

In one embodiment, the defined threshold is part of an auto scaling policy indicating conditions for increasing or decreasing compute capacity provided by the fleet of compute instances.

The operations 400 further include, at block 412, determining that the fleet load metric (or the fleet utilization metric) exceeds (or falls below) a defined threshold. In one embodiment, the defined threshold is part of an auto scaling policy indicating conditions for increasing or decreasing compute capacity provided by the fleet of compute instances.

The operations 400 further include, at block 414, scaling a number of compute instances in the fleet of compute instances by causing additional compute instances to be added to the fleet of compute instances or causing compute instances to be removed from the fleet of compute instances based on the fleet load metric. For example, the auto scaling service 106 can send one or more scaling instructions to a hardware virtualization service 102 or other system component that is capable of managing a fleet of compute instance executing the service.

In one embodiment, the fleet of compute instances executing the software application is a first fleet of compute instances executing a first software application, and wherein the fleet load metric is a first fleet load metric, and the operations further include calculating, for a second fleet of compute instances executing a second software application that is related to the first software application, a second fleet load metric, and causing additional compute instances to be added to the second fleet of compute instances based on the second fleet load metric. For example, the first software application and second software application can be separate services of a service-oriented software application comprising a plurality of services.

In one embodiment, the fleet of compute instances is managed by a hardware virtualization service of a service provider network, and wherein an auto scaling process of the service provider network causes the additional compute instances to be added to the fleet of compute instances.

In one embodiment, the fleet utilization metric is a first fleet utilization metric indicating utilization of worker pools at the compute instances of the fleet of compute instances at a first point in time, and the operations further include obtaining a second fleet utilization metric indicating utilization of worker pools at the compute instances of the fleet of compute instances at a second point in time, determining that the second fleet utilization metric is less than a defined threshold, and causing compute instances to be removed from the fleet of compute instances.

Figure 5:
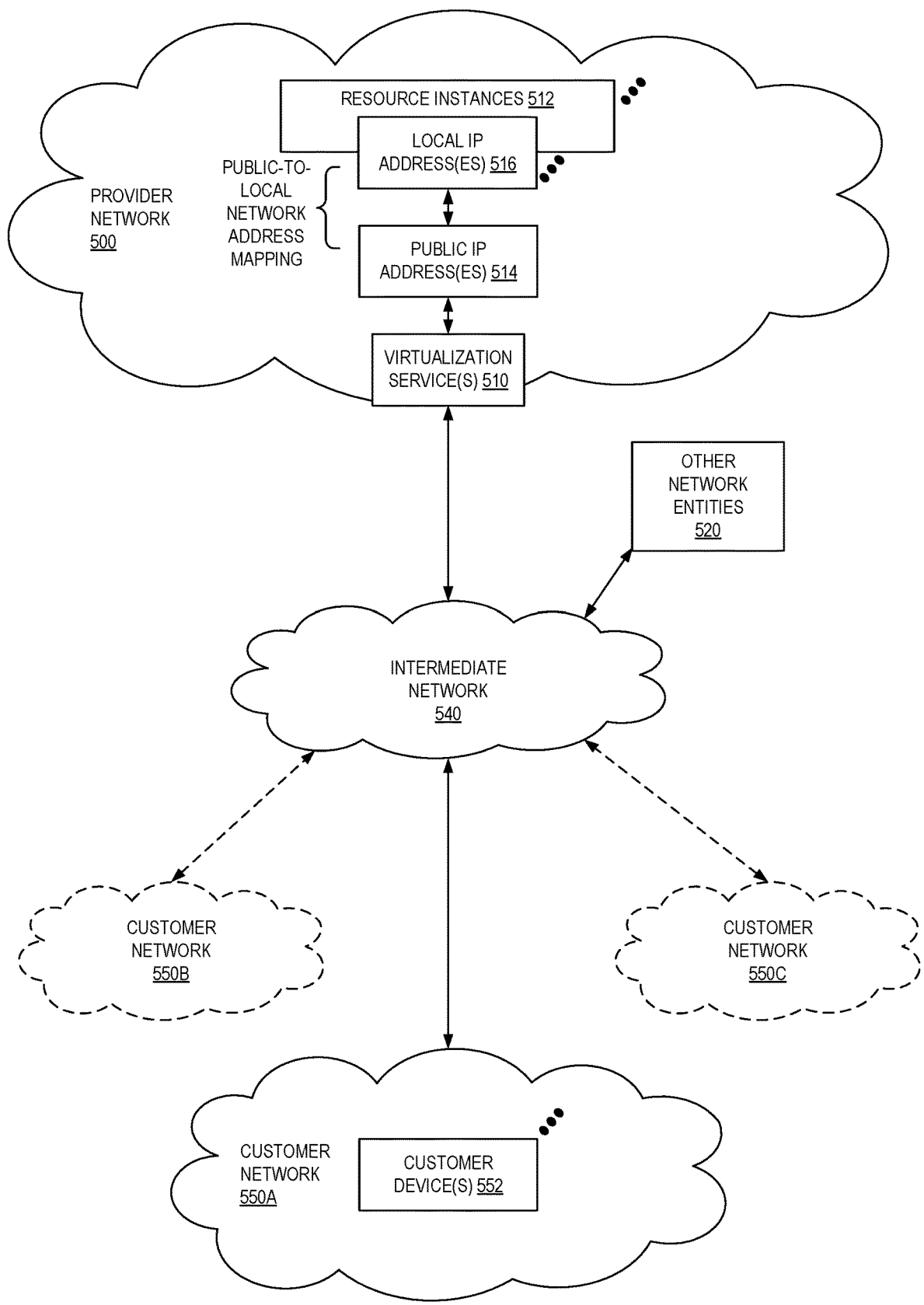
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 may be associated with the resource instances 512; the local IP addresses are the internal network addresses of the resource instances 512 on the provider network 500. In some embodiments, the provider network 500 may also provide public IP addresses 514 and/or public IP address ranges (for example, Internet Protocol version 4 (IPv4) or Internet Protocol version 6 (IPv6) addresses) that customers may obtain from the provider 500.

Conventionally, the provider network 500, via the virtualization services 510, may allow a customer of the service provider (for example, a customer that operates one or more client networks 550A-M50C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-M50C may, for example, implement customer-specific applications and present the customer's applications on an intermediate network 540, such as the Internet. Other network entities 520 on the intermediate network 540 may then generate traffic to a destination public IP address 514 published by the customer network(s) 550A-M50C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
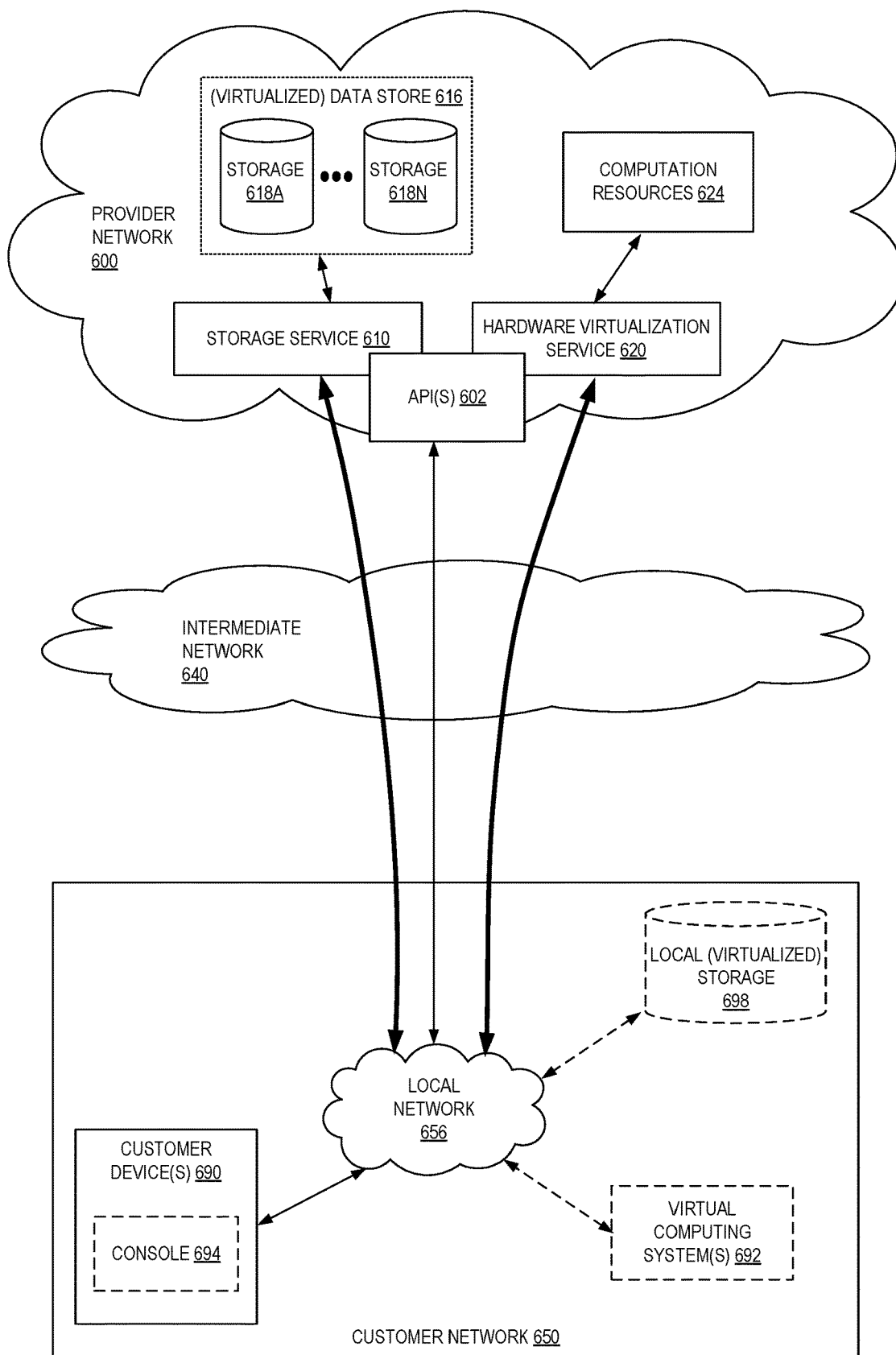
FIG. 6 is a block diagram of an example provider network that provides a storage service and a hardware virtualization service to customers according to some embodiments.

FIG. 6 is a block diagram of an example provider network that provides a storage service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (for example, a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (for example, via console 694), the customer may access the functionality of storage service 610, for example via one or more APIs 602, to access data from and store data to storage resources 618A-P18N of a virtual data store 616 (for example, a folder or "bucket", a virtualized volume, a database, etc.) provided by the provider network 600. In some embodiments, a virtualized data store gateway (not shown) may be provided at the customer network 650 that may locally cache at least some data, for example frequently-accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes via storage service 610 acting as a storage virtualization service, and these volumes may appear to the user as local (virtualized) storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
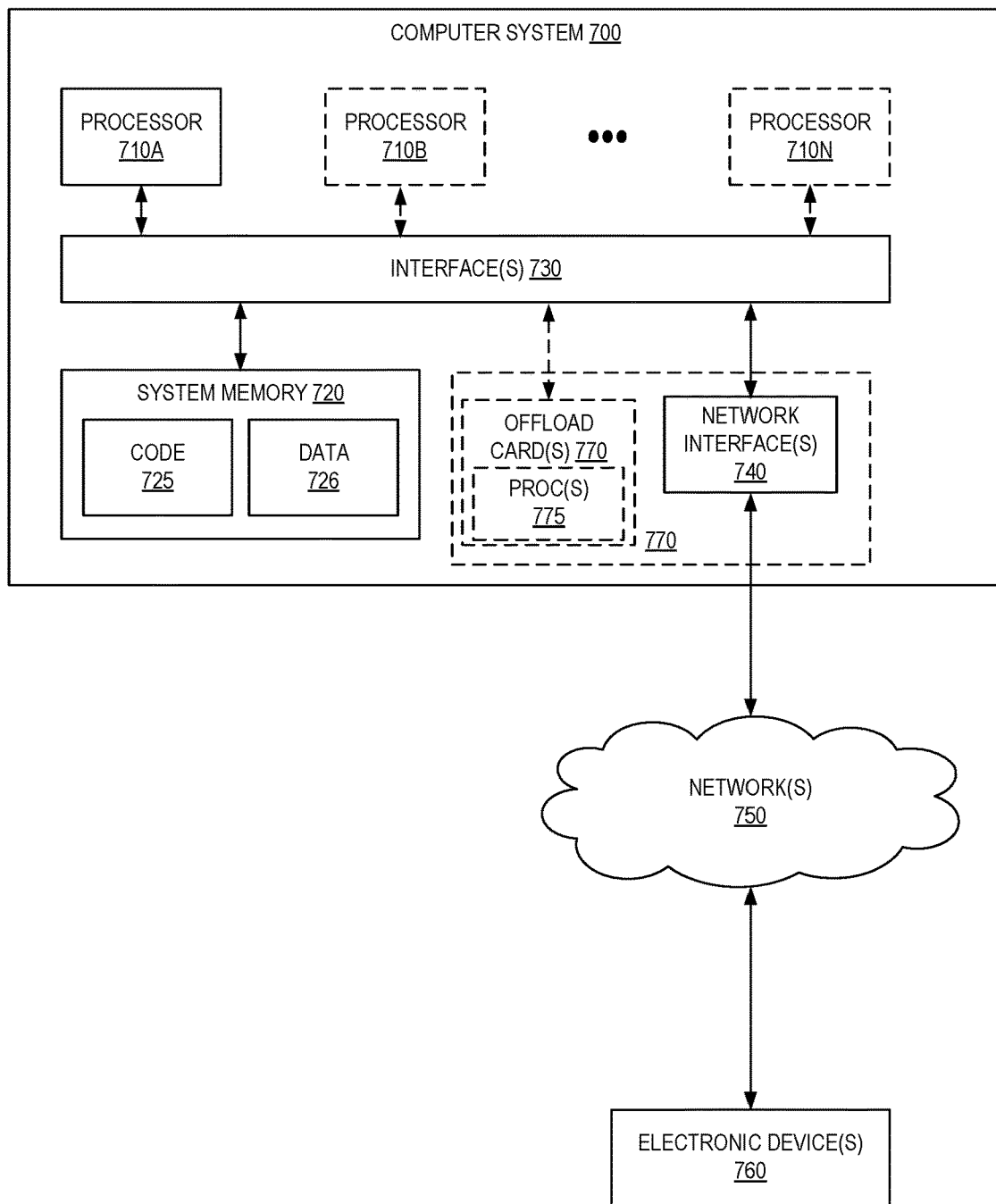
FIG. 7 is a block diagram illustrating an example computer system that may be used in some embodiments.

In some embodiments, a system that implements a portion or all of the techniques for auto scaling compute resources used to support execution of service-oriented software applications and other types of applications that may process heterogeneous workloads as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (for example, operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (for example, upon a request from a hypervisor) that is executed by the other processors 710A-S10N of the computer system 700. However, in some embodiments the virtualization manager implemented by the offload card(s) 770 can accommodate requests from other entities (for example, from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 618A-618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method, comprising:
    obtaining, for a fleet of compute instances executing a software application, a fleet utilization metric indicating utilization of worker pools at compute instances of the fleet of compute instances, the worker pools representing a number of concurrent requests that can be processed by the compute instances of the fleet of compute instances, a processed requests metric indicating a number of requests successfully processed by the fleet of compute instances in a past time window, and a pending requests metric indicating a number of requests awaiting processing by the fleet of compute instances;
    calculating a current throughput metric based on the processed requests metric and the fleet utilization metric;
    calculating a fleet load metric based on the current throughput metric and the pending requests metric; and
    scaling a number of compute instances in the fleet of compute instances based on the fleet load metric.

2. The computer-implemented method of claim 1, wherein the fleet utilization metric is based on a respective worker pool utilization metric generated by each compute instance of the fleet of compute instances, and wherein one or more compute instances of the fleet of compute instances calculates a respective worker pool utilization metric based on one or more of: latencies associated with requests sent to one or more dependent services, or error responses received from one or more dependent services.

3. The computer-implemented method of claim 1, wherein the fleet of compute instances executing the software application is a first fleet of compute instances executing a first software application, and wherein the fleet load metric is a first fleet load metric, the method further comprising:
    calculating, for a second fleet of compute instances executing a second software application that is related to the first software application, a second fleet load metric; and
    scaling a number of compute instances in the second fleet of compute instances based on the second fleet load metric.

4. A computer-implemented method comprising:
    obtaining a fleet utilization metric indicating, for a fleet of compute instances executing a software application, utilization of worker pools at compute instances of the fleet of compute instances, wherein the worker pools process requests using one or more computing resources of the compute instances upon which the worker pools are executing;
    determining that the fleet utilization metric exceeds a defined threshold; and
    scaling a number of compute instances in the fleet of compute instances based on the fleet utilization metric.

5. The computer-implemented method of claim 4, further comprising:
    obtaining a processed requests metric indicating a number of requests successfully processed by the fleet of compute instances in a past time window, and a pending requests metric indicating a number of requests awaiting processing by the fleet of compute instances;
    calculating a current throughput metric based on the processed requests metric and the fleet utilization metric;
    calculating a fleet load metric based on the current throughput metric and the pending requests metric; and
    wherein scaling the number of compute instances in the fleet of compute instances is based on the fleet load metric.

6. The computer-implemented method of claim 4, wherein the fleet utilization metric is based on a respective worker pool utilization metric generated by each compute instance of the fleet of compute instances, and wherein one or more compute instances of the fleet of compute instances calculates a respective worker pool utilization metric based on one or more of: latencies associated with requests sent to one or more dependent services, or error responses received from one or more dependent services.

7. The computer-implemented method of claim 4, wherein the fleet of compute instances executing the software application is a first fleet of compute instances executing a first software application, and wherein the fleet utilization metric is a first fleet utilization metric, the method further comprising:
    calculating, for a second fleet of compute instances executing a second software application that is related to the first software application, a second fleet utilization metric; and
    scaling a number of compute instances in the second fleet of compute instances based on the second fleet utilization metric.

8. The computer-implemented method of claim 4, wherein the software application is a service of a service-oriented software application comprising a plurality of separate services.

9. The computer-implemented method of claim 4, wherein the fleet of compute instances is managed by a hardware virtualization service of a service provider network, and wherein an auto scaling process of the service provider network scales the number of compute instances in the fleet of compute instances.

10. The computer-implemented method of claim 4, wherein the fleet utilization metric is a first fleet utilization metric indicating utilization of worker pools at the compute instances of the fleet of compute instances at a first point in time, the method further comprising:
    obtaining a second fleet utilization metric indicating utilization of worker pools at the compute instances of the fleet of compute instances at a second point in time;
    determining that the second fleet utilization metric is less than a defined threshold; and
    scaling down the number of compute instances in the fleet of compute instances.

11. The computer-implemented method of claim 4, wherein the fleet utilization metric is based on worker pool utilization metrics periodically obtained from a data monitoring service of a service provider network, and wherein each compute instance of the fleet of compute instances periodically obtains and sends a respective worker pool utilization metric to the data monitoring service.

12. The computer-implemented method of claim 4, wherein each compute instance of the fleet of compute instances manages a respective worker pool, the respective worker pool representing a number of concurrent requests that can be processed by the compute instance managing the respective worker pool at a time.

13. The computer-implemented method of claim 4, wherein the defined threshold is part of an auto scaling policy indicating conditions for increasing or decreasing compute capacity provided by the fleet of compute instances.

14. The computer-implemented method of claim 4, further comprising:
- obtaining a pending requests metric indicating a number of requests awaiting processing by the fleet of compute instances, wherein the pending requests metric is obtained from one or more of: a load balancer, or a request queue;
- calculating a fleet load metric based on the pending requests metric; and
- wherein scaling the number of compute instances in the fleet of compute instances is based on the fleet load metric.

15. A system comprising:
- a fleet of compute instances executing a software application, the fleet of compute instances implemented by a first one or more electronic devices, the software application including instructions that upon execution periodically cause the software application to:
  - obtain worker pool utilization metrics and processed requests metrics, the worker pool utilization metrics indicating utilization of worker pools at compute instances of the fleet of compute instances, and the processed requests metrics indicating a number of requests successfully processed by compute instances of the fleet of compute instances in a past time window; and
  - send the worker pool utilization metrics and the processed requests metrics to a data monitoring service of a service provider network; and
- a scaling process of a hardware virtualization service implemented by a second one or more electronic devices, the scaling process including instructions that upon execution cause the scaling process to:
  - obtain the worker pool utilization metrics and processed requests metrics from the data monitoring service;
  - obtain a pending requests metric indicating a number of requests awaiting processing by the fleet of compute instances;
  - calculate a fleet utilization metric based on the worker pool utilization metrics, calculate a current throughput metric based on the processed requests metric and the fleet utilization metric, and calculate a fleet load metric based on the current throughput metric and the pending requests metric; and
  - scale a number of compute instances in the fleet of compute instances based on the fleet load metric.

16. The system of claim 15, wherein the fleet utilization metric is based on a respective worker pool utilization metric generated by each compute instance of the fleet of compute instances, and wherein one or more compute instances of the fleet of compute instances calculates a respective worker pool utilization metric based at least in part on one or more of: latencies associated with requests sent to one or more dependent services, error responses received from one or more dependent services.

17. The system of claim 15, wherein the software application is a service of a service-oriented software application comprising a plurality of separate services.

18. The system of claim 15, wherein the fleet utilization metric is a first fleet utilization metric indicating utilization of worker pools at the compute instances of the fleet of compute instances at a first point in time, and wherein the scaling process further includes instructions that upon execution cause the scaling process to:
- obtain a second fleet utilization metric indicating utilization of worker pools at the compute instances of the fleet of compute instances at a second point in time;
- determine that the second fleet utilization metric is less than a defined threshold; and
- scale down the number of compute instances in the fleet of compute instances.

19. The system of claim 15, wherein each compute instance of the fleet of compute instances manages a respective worker pool, the respective worker pool representing a number of concurrent requests that can be processed by the compute instance managing the respective worker pool at a time.

20. The system of claim 15, wherein the scaling process determines that the fleet utilization metric exceeds a defined threshold, and wherein the defined threshold is part of an auto scaling policy indicating conditions for increasing or decreasing compute capacity provided by the fleet of compute instances.

* * * * *